(12) United States Patent
Aylward

(10) Patent No.: US 10,464,743 B2
(45) Date of Patent: Nov. 5, 2019

(54) TANK MADE OF A COMPOSITE MATERIAL

(71) Applicant: Glen Aylward, Barrington (CA)

(72) Inventor: Glen Aylward, Barrington (CA)

(*) Notice: Subject to any disclaimer, the term of this patent is extended or adjusted under 35 U.S.C. 154(b) by 284 days.

(21) Appl. No.: 15/241,154

(22) Filed: Aug. 19, 2016

(65) Prior Publication Data
US 2016/0355330 A1    Dec. 8, 2016

Related U.S. Application Data

(62) Division of application No. 13/793,489, filed on Mar. 11, 2013, now Pat. No. 9,446,898.

(30) Foreign Application Priority Data

Feb. 11, 2013   (CA) .................................... 2805826

(51) Int. Cl.
*B65D 90/02* (2019.01)
*B29C 70/44* (2006.01)
*B65D 90/12* (2006.01)

(52) U.S. Cl.
CPC ............ *B65D 90/02* (2013.01); *B29C 70/443* (2013.01); *B65D 90/12* (2013.01)

(58) Field of Classification Search
None
See application file for complete search history.

(56) References Cited

U.S. PATENT DOCUMENTS

| 3,735,895 A * | 5/1973 | Roper ................... B65D 90/02 220/565 |
| 5,041,260 A | 8/1991 | Johnson |
| 6,510,959 B1 * | 1/2003 | Van Newenhizen ........................ B65D 90/046 220/327 |
| 2009/0266823 A1 | 10/2009 | Mazabraud |

OTHER PUBLICATIONS

U.S., Notice of Allowance, U.S. Appl. No. 13/793,489 (dated Jun. 3, 2016).
U.S., Office Action, U.S. Appl. No. 13/793,489 (dated Mar. 11, 2016).
U.S., Office Action, U.S. Appl. No. 13/793,489 (dated Dec. 10, 2015).

* cited by examiner

*Primary Examiner* — Monica A Huson
(74) *Attorney, Agent, or Firm* — Thompson Hine LLP

(57) ABSTRACT

A tank including a single tank body made as a single piece of a composite material using a closed molding process with a first portion of the tank body having an outside surface corresponding to a first molding surface of a first mold and a second portion of the tank body having an outside surface corresponding to a second molding surface of a second mold. The tank body has an opening disposed therein with the opening being substantially smaller than the tank body. The tank further includes a fitting member mounted to a portion of the tank body surrounding the opening.

6 Claims, 10 Drawing Sheets

TANK MADE OF A COMPOSITE MATERIAL

This application is a divisional of U.S. patent application Ser. No. 13/793,489, now U.S. Pat. No. 9,446,898, filed on Mar. 11, 2013 and entitled Tank Made Of A Composite Material And Closed Molding Process For Manufacturing The Same, which in turn claims priority to Canadian Patent Application Serial No. 2805826, entitled Tank Made Of A Composite Material And Closed Molding Process For Manufacturing The Same, filed on Feb. 11, 2013 in the name of inventor Glen Aylward. The entire contents of both of these documents are incorporated herein by reference.

FIELD

The present invention relates to tanks, and more particularly to tanks made of a composite material and a closed molding process for manufacturing the same.

BACKGROUND

Tanks used in numerous applications such as, for example, oil tanks, water tanks and compressor tanks are nowadays made of a composite material such as, for example, a fiberglass composite material. Use of a composite material provides a light weight and substantially corrosion resistant tank.

State of the art composite material tanks are made using a chopper gun. Unfortunately, this process exposes the operator of the chopper gun as well as the environment to fine particles and volatile resin components during operation of the chopper gun and, furthermore, exposes the uncured resin to the atmosphere. Further disadvantages are an unappealing finish of the outside surface of the tank as well as inconsistent quality of the tank depending on the skill of the operator.

Another process for producing composite material parts is the vacuum infusion process, which is carried out within a closed molding system, i.e. the void between a sealed bag and a mold, or between two sealed molds. This process is capable of producing composite material parts of high and consistent quality.

Typically, composite material tanks are made in two halves which are joined together using an adhesive, resulting in a bond line substantially weakening the tank.

It is desirable to provide a method for manufacturing a composite material tank in substantially a single piece using a closed molding process.

It is also desirable to provide a composite material tank that is manufactured in substantially a single piece using the closed molding process.

SUMMARY

Accordingly, one object of the present invention is to provide a method for manufacturing a composite material tank in substantially a single piece using a closed molding process.

Another object of the present invention is to provide a composite material tank that is manufactured in substantially a single piece using the closed molding process.

According to one aspect of the present invention, there is provided a method for manufacturing a tank. A first mold having a first molding surface corresponding to a first portion of an outside surface of the tank is provided. A second mold having a second molding surface corresponding to a second portion of the outside surface of the tank is provided. The first portion and the second portion form the outside surface of the tank having an opening disposed therein. A mold release agent is disposed onto the first and second molding surface. A molding bladder is provided. An outside surface of the molding bladder when inflated substantially corresponds to an inside surface of the tank having the opening disposed therein. A reinforcement material is disposed onto one of the molding bladder and the molding surfaces. The first and the second mold are combined in a sealed fashion. The first and the second mold have accommodated therebetween the reinforcement material and the molding bladder. A molding space between the molding bladder and the combined first and second mold is sealed. The molding space contains the reinforcement material. The molding space is evacuated. The evacuated molding space is then filled with a resin. The resin is cured to form a wall of the tank. The molding bladder is deflated and removed through the opening. The first and the second mold are separated and removed from the tank.

According to another aspect of the present invention, there is provided a tank. The tank comprises a single tank body made as a single piece of a composite material using a vacuum infusion process with a first portion of the tank body having an outside surface corresponding to a first molding surface of a first mold and a second portion of the tank body having an outside surface corresponding to a second molding surface of a second mold. The tank body has an opening disposed therein with the opening being substantially smaller than the tank body. A fitting member is mounted to a portion of the tank body surrounding the opening.

An advantage of the present invention is that it provides a method for manufacturing a composite material tank in substantially a single piece using a closed molding process.

A further advantage of the present invention is that it provides a composite material tank that is manufactured in substantially a single piece using the closed molding process.

BRIEF DESCRIPTION OF THE DRAWINGS

Certain embodiments of the present invention are described below with reference to the accompanying drawings, in which.

DETAILED DESCRIPTION

Figure 1A:
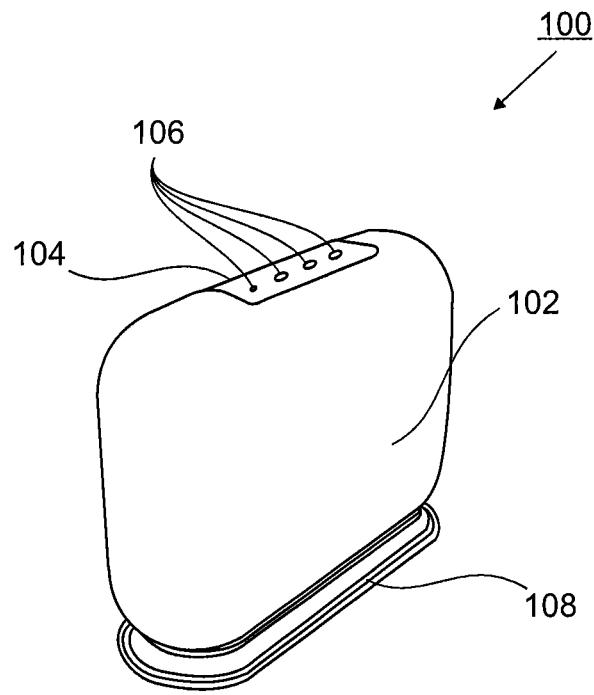
FIGS. 1a to 1d are simplified block diagrams illustrating a perspective view, a front view, a top view, and a side view, respectively, of a domestic oil tank made of a composite material according to one embodiment of the invention.
Figure 1B:
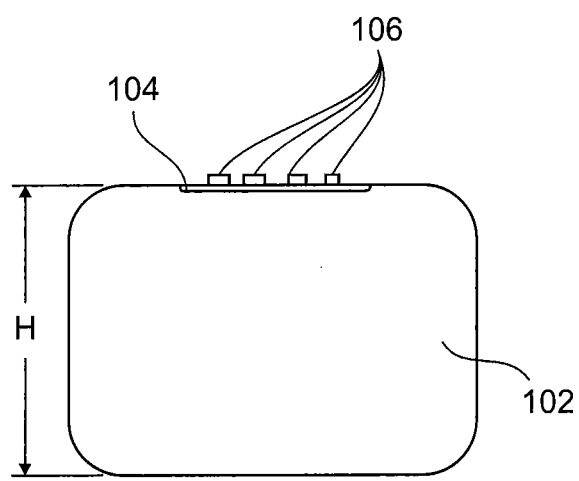
Figure 1C:
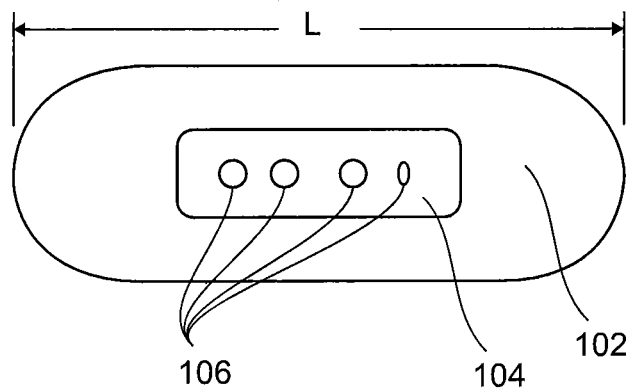
Figure 1D:
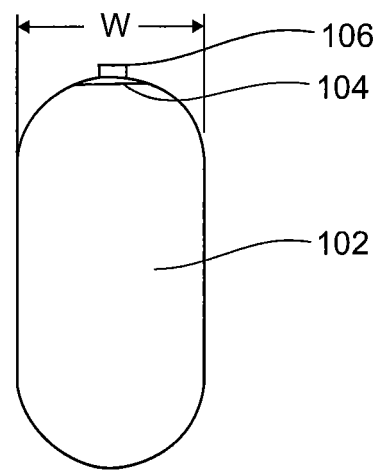

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, certain methods and materials are now described.

While embodiments of the invention will be described for manufacturing an oil tank for domestic use, it will become evident to those skilled in the art that the embodiments of the invention are not limited thereto, but are also adaptable for manufacturing various other types of tanks such as, for example, water tanks, compressor tanks, and propane tanks for domestic use as well as industrial use. Furthermore, it will become evident to those skilled in the art that the embodiments of the invention are not limited to the employment of fiberglass as reinforcement material, but are adaptable to the use of various other reinforcement materials such as, for example, carbon fiber.

Referring to FIGS. 1a to 1e, a domestic oil tank 100 made of a composite material according to one embodiment of the invention is provided. The tank 100 comprises a single tank body 102 made as a single piece of a composite material using a closed molding process according to one embodiment of the invention described hereinbelow. The tank body 102 has an opening 110 disposed therein. In one case the opening 110 is substantially smaller than the tank body 102 and is covered by a fitting member 104 mounted to a portion of the tank body 102 surrounding the opening 110 with the fitting member 104 having, for example, fittings 106 for being connected to: a fill pipe; a vent pipe; a supply pipe; and a level gauge. The tank 100 can also comprise a base member 108 mounted to a bottom portion of the tank body 102.

Figure 1E:
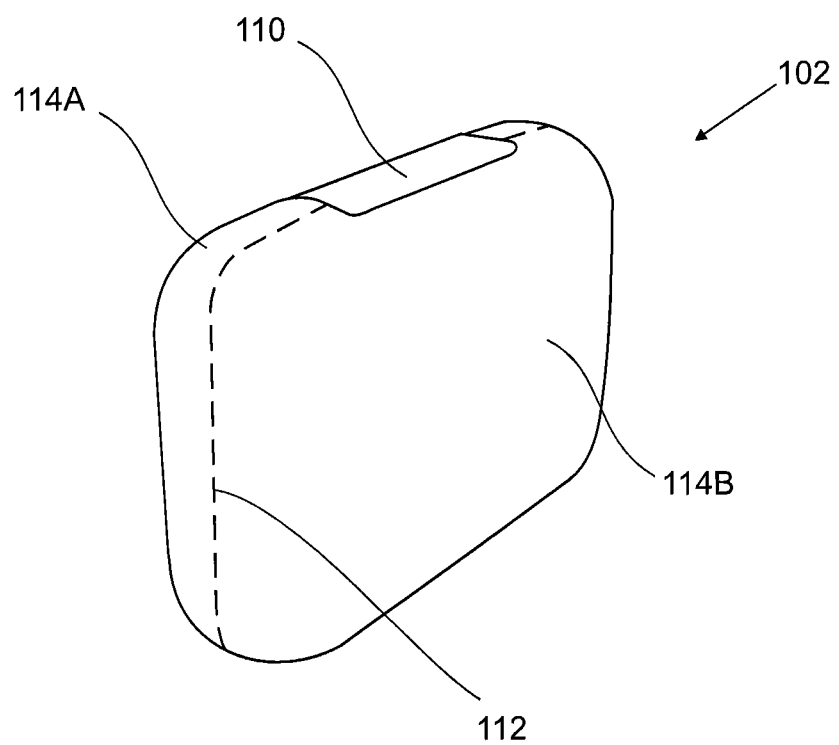
FIG. 1e is a simplified block diagram illustrating a perspective view of a tank body made of a composite material according to one embodiment of the invention.

The tank body 102 is designed to enable manufacture using a closed mold vacuum infusion process according to one embodiment of the invention provided hereinbelow with reference to FIGS. 2a to 2i. A first portion of the tank body 102 has an outside surface 114A corresponding to a first molding surface 204A of a first mold 202A and a second portion of the tank body 102 has an outside surface 114B corresponding to a second molding surface 204B of a second mold 202B. The outside surfaces 114A and 114B are designed—based on standard molding technology—such that during the molding process the molds 202A and 202B are in contact at seam 112 and can be separated and removed from the outside surfaces 114A and 114B after curing of the tank body 102. The outside surfaces 114A and 114B illustrated in FIG. 1e are symmetric with respect to the seam 112. As is evident to one skilled in the art, while facilitating the design and manufacture of the molds 202A, 202B, it is not necessary for the outside surfaces 114A and 114B to be symmetric, i.e. the outside surfaces 114A and 114B can be of different shape as long as they can be combined at the seam 112.

Referring to FIGS. 2a to 2i a closed mold vacuum infusion process according to one embodiment of the invention is provided. Based on the outside surfaces 114A and 114B of the tank body 102, molds 202A and 202B are designed and provided. The molds 202A and 202B can be designed simultaneously with the outside surfaces 114A and 114B of the tank body 102. The molds 202A, 202B comprise the molding surfaces 204A, 204B surrounded by sealing flanges 206A, 206B with a portion 208A, 208B being recessed corresponding to the opening 110. Flange seal 212 is disposed on the flange 206A to provide seal space 214 therebetween which is, in one case, sealed in an airtight fashion. Furthermore, opening seals 216A, 216B are disposed on the recessed flange portions 208A, 208B to provide seal spaces 218A, 218B, respectively. Evacuation port 222 is disposed in flange 206A and designed for being connected to a vacuum pump. The molds 202A, 202B can be made of a fiberglass material having sufficient wall thickness to provide sufficient rigidity to the molds 202A, 202B for executing the molding process absent deformation of the same. Of course, other materials such as metals are also applicable, but the fiberglass material may be useful for providing sufficient rigidity while being lightweight for facilitating handling of the molds.

In a first step of the closed mold vacuum infusion process the molding surfaces 204A, 204B are coated with a release agent to aid in the separation of the molding surfaces 204A, 204B from the outside surfaces 114A and 114B of the tank body 102 after curing and to reduce imperfections in the molding surfaces 204A, 204B in order to provide smooth outside surfaces 114A and 114B. The molding surfaces 204A, 204B can be coated with a thin layer—approximately 0.5 mm—of ENGUARD FR SERIES FIRE RETARDANT ISO/NPG GELCOAT.

Figure 2A:
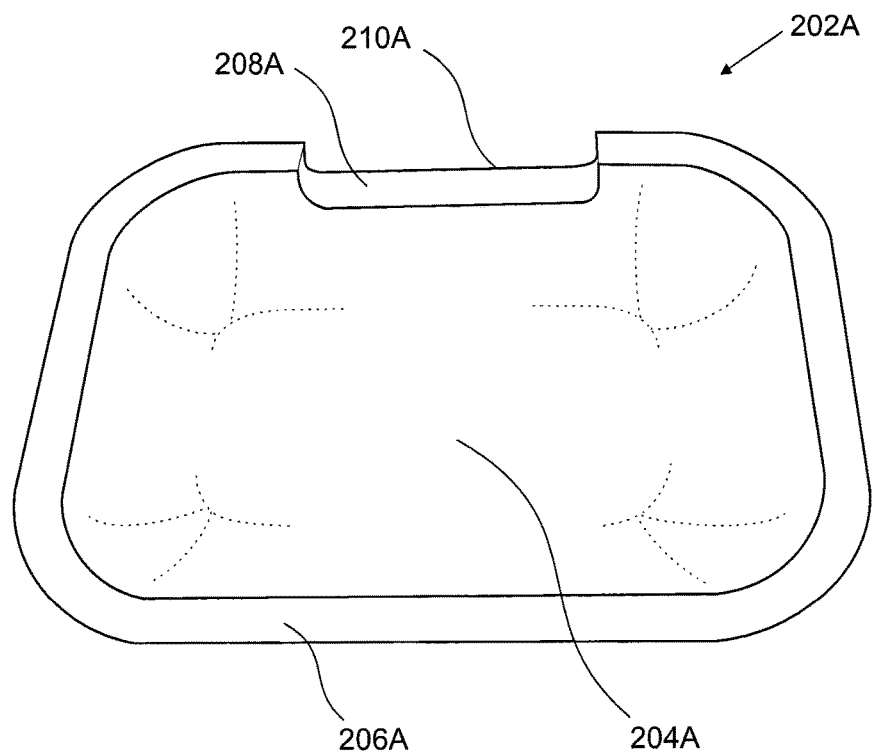
FIGS. 2a to 2c are simplified block diagrams illustrating a perspective view, a cross sectional view, and a top view, respectively, of a first mold used in a closed mold vacuum infusion process according to one embodiment of the invention.
Figure 2B:
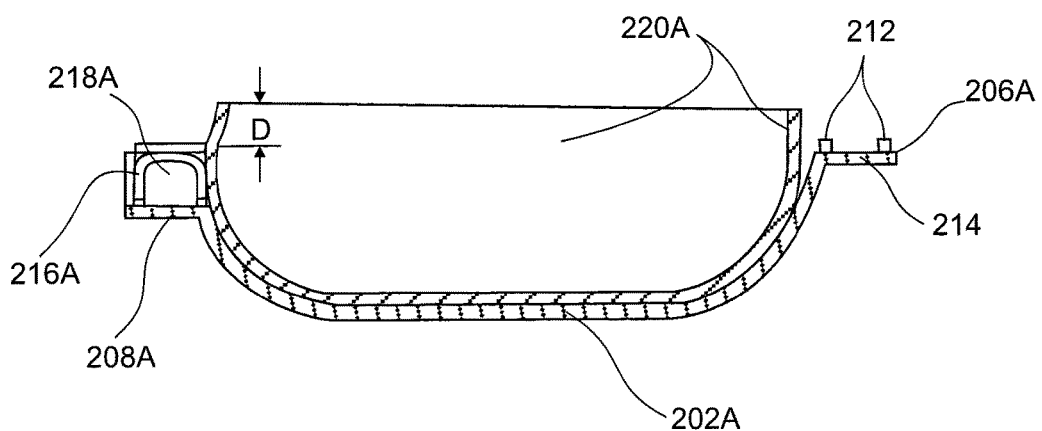
Figure 2C:
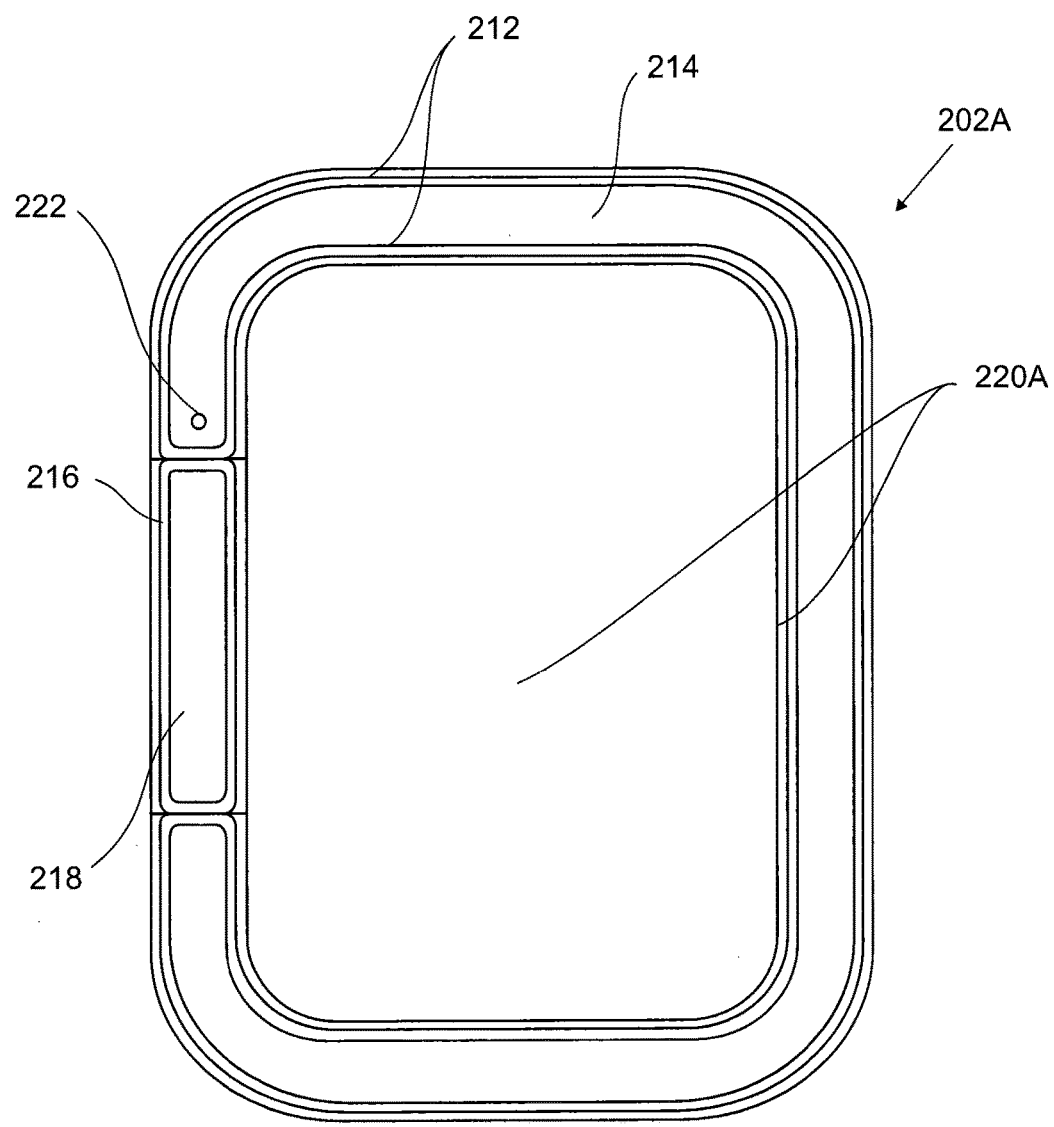
Figure 2D:
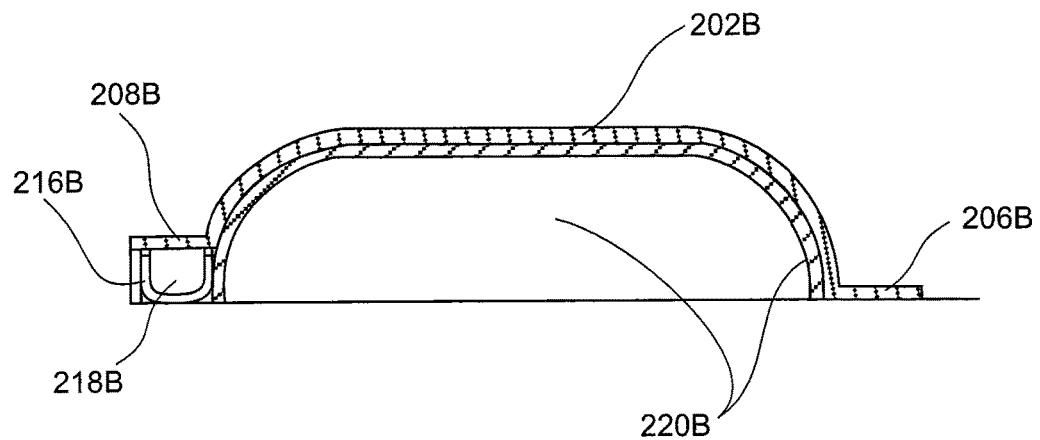
FIG. 2d is a simplified block diagram illustrating a cross sectional view of a second mold used in the closed mold vacuum infusion process according to one embodiment of the invention.
Figure 2E:
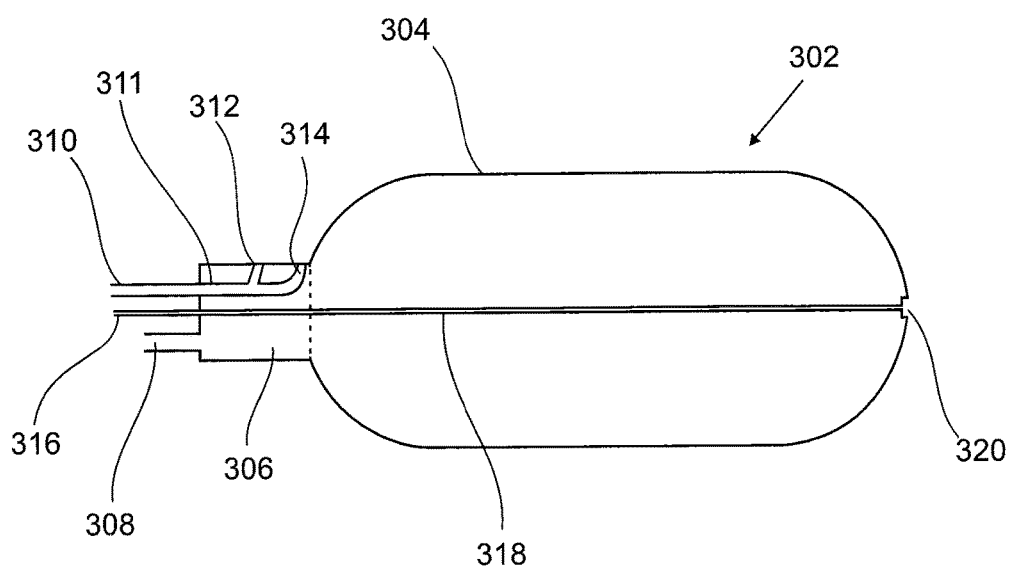
FIG. 2e is a simplified block diagram illustrating a cross sectional view of a molding bladder used in the closed mold vacuum infusion process according to one embodiment of the invention.

Next, the reinforcement material is placed onto the molding surfaces 204A, 204B. In one case, the reinforcement material is a layer of fiberglass fabric. A fiberglass fabric with a thermo set powder in the glass such as, for example, UM-720 fiberglass fabric, can be employed. The fiberglass fabric can preformed to correspond to the molding surfaces 204A, 204B such that each molding surface is covered with one layer of fabric 220A, 220B and such that the fabric layer 220A disposed in mold 202A is protruding the mold 202A a predetermined distance D—for example, 3 inches—producing an overlap of the layers 220A, 220B of the same distance, as illustrated in FIGS. 2b and 2g. The predetermined distance D is designed to provide sufficient strength to the tank body 102 at the seam 112 depending, for example, on the size of the tank body 102 and an inside pressure range the tank body 102 is designed to withstand. Optionally, more than one layer of the reinforcement material is disposed on each molding surface. Further optionally, the layers are designed such that different layers overlap at a different location in order to further increase the strength of the tank body 102. Alternatively, other reinforcement materials are employed such as, for example, carbon fiber or various organic fibers or combinations thereof known to one skilled in the art. Optionally, the fabric layers 220A, 220B are secured to the respective mold surfaces 204A, 204B using a commercially available spray adhesive such as, for example, a styrene based spray adhesive for temporarily bonding light and medium weight fiber reinforcements.

Figure 2F:
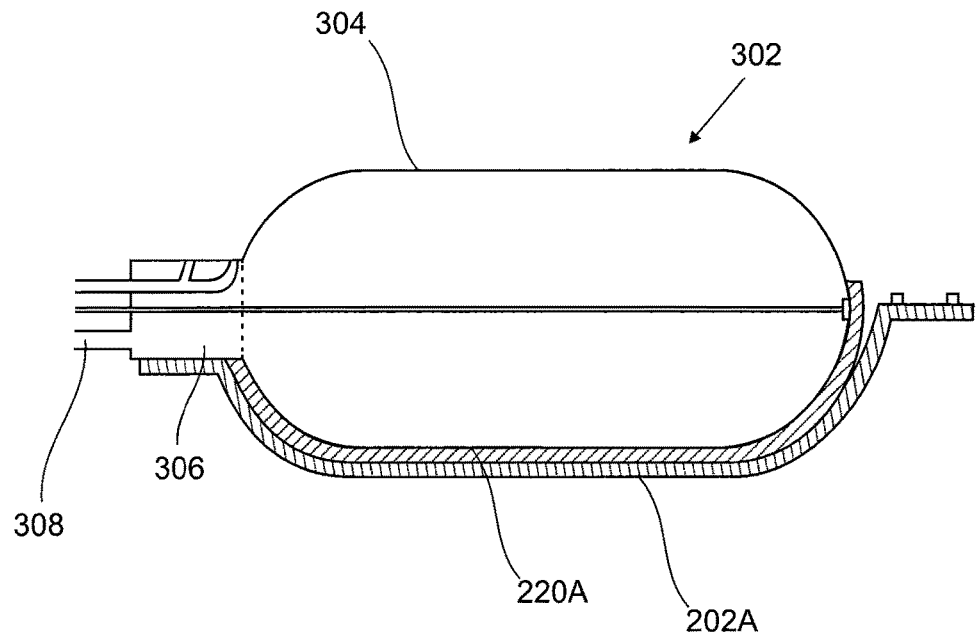
FIG. 2f is a simplified block diagram illustrating a cross sectional view of the first mold with the molding bladder used in the closed mold vacuum infusion process according to one embodiment of the invention.
Figure 2G:
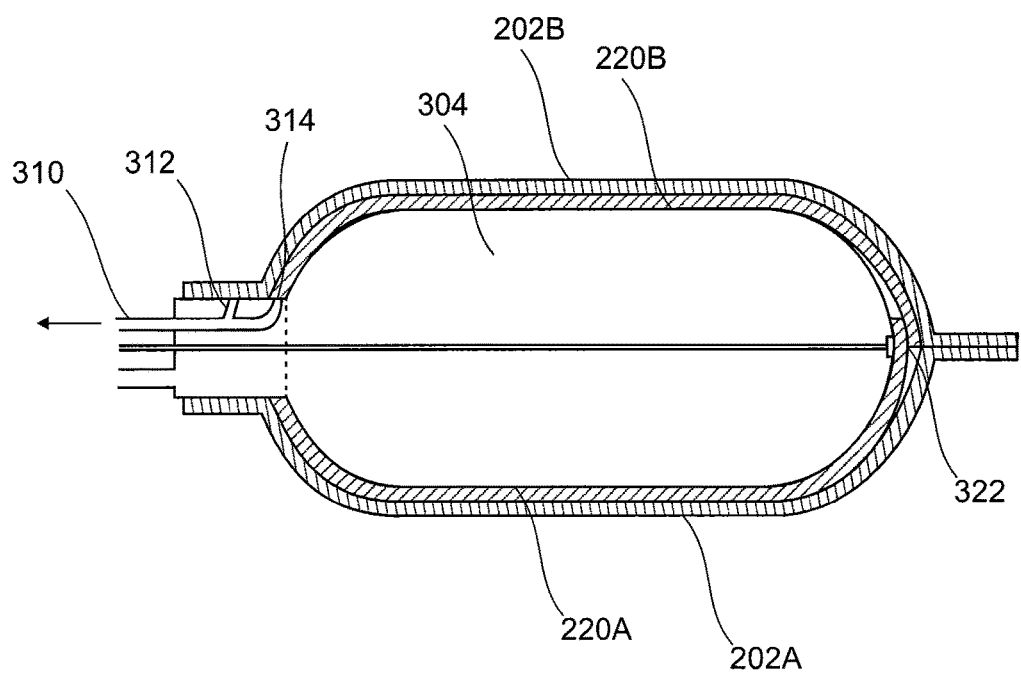
FIG. 2g is a simplified block diagram illustrating a cross sectional view of the combined first and second mold with the molding bladder used in the closed mold vacuum infusion process according to one embodiment of the invention.
Figure 2H:
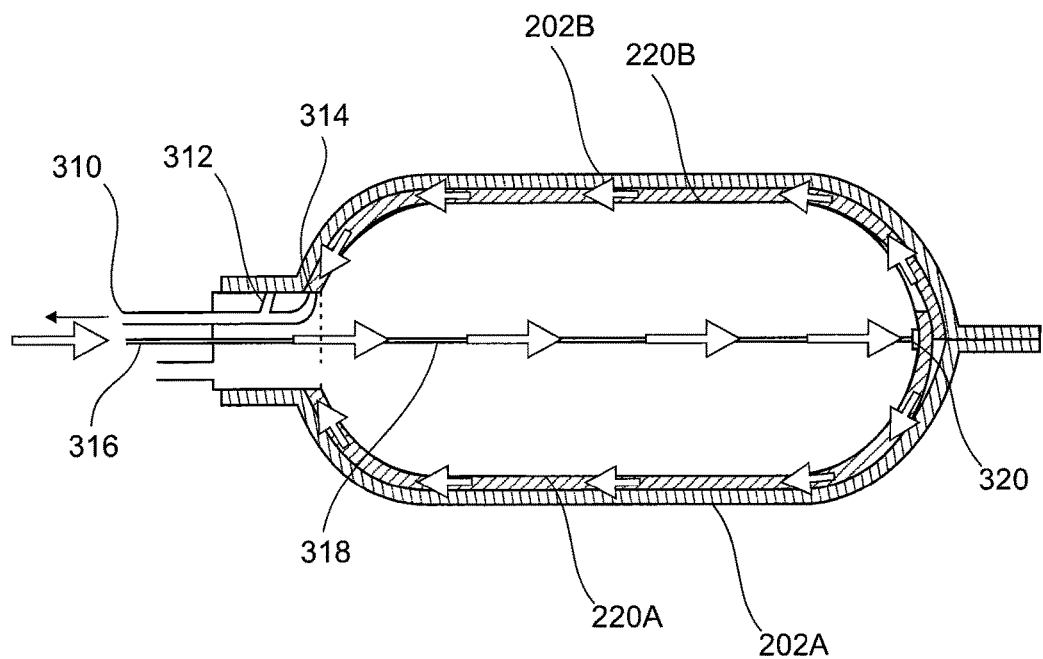
FIG. 2h is a simplified block diagram illustrating the resin flow in a cross sectional view of the combined first and second mold with the molding bladder used in the closed mold vacuum infusion process according to one embodiment of the invention.

After placement of the reinforcement material, molding bladder 302 is placed into the mold 202A onto reinforcement layer 220A and inflated to a pressure such that an outside surface 304 of the molding bladder corresponds approximately to an inside surface of the tank body 102 and is capable of holding the reinforcement layer 220A in place, as illustrated in FIG. 2f, as well as the reinforcement layer 220B after combining the molds 202A and 202B in a later step. Alternatively, the reinforcement layer 220B is placed onto the molding bladder 302 instead of being placed into the mold 202B.

The molding bladder 302, illustrated in FIG. 2e, is designed such that during the molding process an outside surface 304 of the inflated molding bladder 302 substantially corresponds to an inside surface of the tank body 102 having the opening 110 disposed therein. Furthermore, the molding bladder 302 comprises a sealing extension 306 for providing, in concert with the opening seals 216A, 216B, an airtight seal between the bladder 302 and the molds 202A, 202B. Resin injection conduit 318 is disposed inside the molding bladder 302 and connected to resin injection port 316 and resin injection aperture 320. The molding bladder 302 is inflated by providing a compressed fluid such as compressed air via inflating port 308. Evacuating conduit 311 is disposed in the sealing extension 306 and connected to evacuating openings 312 and 314 and evacuating port 310 for being connected to a vacuum pump. The molding bladder 302 is made of a flexible material such as, for example, a silicone rubber material for enabling re-use of the same. The evacuating conduit 311 and the resin injection conduit 318 are made of a flexible material such as, for example, a silicone rubber material or, alternatively, a rigid material.

After placing and inflating the molding bladder 302, the molds 202A, 202B are combined and sealed in a substantially airtight fashion by evacuating the seal space 214 via evacuation port 222 to a predetermined vacuum, such as a low vacuum of approximately 3000 Pa. Alternatively, the molds 202A, 202B are combined and sealed in a substantially airtight fashion by clamping the flanges using, for example, a plurality of clamps. Further alternatively, inflation of the molding bladder 302 is omitted in case the fabric layers 220A, 220B are secured to the respective mold surfaces 204A, 204B using, for example, a Tack Spray Adhesive and the sealing extension 306 is designed to provide a proper seal absent inflation of the molding bladder 302.

Further alternatively, the molding bladder 302 is inflated to net shape and the reinforcement material is then disposed onto the outside surface 304 of the molding bladder 302 using the Tack Spray Adhesive. The molding bladder 302 with the reinforcement material is then placed onto molding surface 204A of mold 202A followed by placement of mold 202B thereupon. Provision of the reinforcement material onto the outside surface of the molding bladder 302 removes the restriction of providing the reinforcement material in two sections with each section substantially corresponding to one of the molding surfaces 204A, 204B resulting in an overlap in proximity to the seam 112.

Next, molding space 322 between the outside surface 304 of the molding bladder 302 and the molding surfaces 204A, 204B, containing the reinforcement layers 220A, 220B, as well as seal spaces 218A, 218B are evacuated to a predetermined vacuum, such as a low vacuum of approximately 3000 Pa via evacuating openings 314 and 312, respectively. Evacuation via evacuating opening 312 provides a substantially airtight seal between the recessed flange portions 208A, 208B of the molds 202A, 202B and the sealing extension 306 of the molding bladder 302, while evacuation via evacuating opening 314 evacuates the molding space 322 including spaces between fibers of the reinforcement material 220A, 220B to ensure penetration of the same by the resin provided in the following step. The molding bladder 302 can be designed such that the outside surface 304 of the molding bladder 302 substantially corresponds to the inside surface of the tank body 102 when the molding space 322 is evacuated to the low vacuum of approximately 3000 Pa.

Once the molding space 322 is evacuated to the predetermined vacuum, the resin—for example, a vinyl ester resin or epoxy resin—is injected into the molding space 322 via resin injection aperture 320 while evacuation of the molding space 322 is continued. The resin can be ISO FLAME RETARDANT DION FR 7767-80. The resin injected via resin injection aperture 320 is then drawn by the vacuum throughout the molding space 322 including the spaces between fibers of the reinforcement material 220A, 220B towards the evacuating opening 314 located at a substantially opposite end portion of the molding space 322 from the location of the resin injection aperture 320, as indicated by the arrows in FIG. 2h, until the resin has reached the evacuating opening 314 or, alternatively, until the resin is drawn through evacuating conduit 311 and evacuating port 310 into, for example, a resin trap interposed between a vacuum pump and evacuating port 310. Optionally, a plurality of resin injection apertures are provided, with all resin injection apertures being placed substantially opposite to the evacuating opening 314 or with some resin injection apertures being placed between the location of the resin injection aperture 320 and the evacuating opening 314, for example, placed in a midsection of the molding bladder 302. Further optionally, the resin is injected into the molding space 322 under pressure with the pressure being determined such that the molding bladder 302 can withstand the same absent deformation. Further optionally, the pressure in the molding bladder 302 is increased such that the molding bladder 302 is capable to withstand the pressure of the injected resin absent deformation.

During the curing process, the temperature of the resin continuously increases while the resin progresses through a gel stage followed by a hardening stage until a peak temperature—called "peak exotherm"—is reached. The peak exotherm temperature depends on the resin and the laminate—or wall—thickness with the peak exotherm temperature being higher with increasing thickness. The temperature can be measured in proximity to the location of the resin injection aperture 320 since at this location the resin starts to gel first due to the increased wall thickness, i.e. mass. The temperature of the resin is measured using, for example, a commercially available infrared gun, enabling measurement through the molding bladder 302 with the molding bladder 302 being made of a transparent material.

Figure 2I:
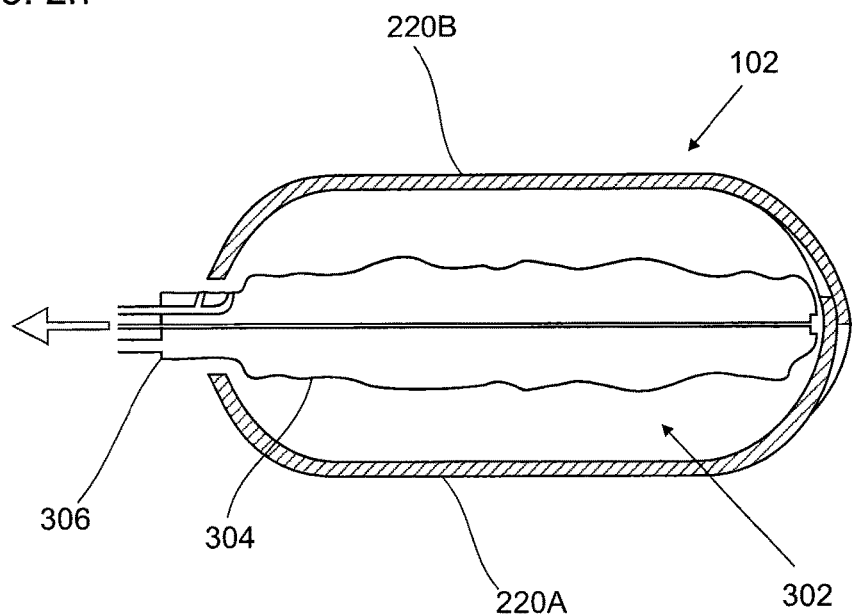
FIG. 2i is a simplified block diagram illustrating in a cross sectional view the removal of the molding bladder from the tank body in the closed mold vacuum infusion process according to one embodiment of the invention.

Once the peak exotherm temperature is reached, the molding bladder 302 is deflated and removed through the opening 110, as illustrated in FIG. 2i. The opening 110 illustrated in FIG. 1e is designed to accommodate the fitting member 104 containing all the fittings 106 and, therefore, is larger than needed to remove the molding bladder 302. The size of the opening 110 needed for removing the molding bladder 302 depends on the shape, size, and material of the molding bladder 302.

After removal of the molding bladder 302 the seal space 214 is vented in order to separate the molds 202A and 202B and to remove the same from the tank body 102, thus releasing the tank body 102.

The reinforcement layers 220A, 220B can be preformed to correspond to the molding surfaces 204A, 204B and to have a constant thickness throughout for providing, in concert with the outside surface 304 of the molding bladder 302, a constant wall thickness of the tank body 102, with the exception of the location of the overlap of the reinforcement layers 220A, 220B. The wall thickness of the tank body 102 is approximately the same as the thickness of the reinforcement layers 220A, 220B and double at the location of the overlap of the reinforcement layers 220A, 220B. The contact of the reinforcement layers 220A, 220B with the outside surface 304 of the molding bladder 302 allows the resin to transfer evenly throughout the reinforcement layers 220A, 220B. With the preformed reinforcement layers 220A, 220B having a substantially constant fiber-to-void ratio the amount of resin used for manufacturing the tank body 102 is substantially the same resulting in a substantially repeatable process for producing tank bodies 102 having substantially same dimensions, weight, and strength.

Figure 3A:
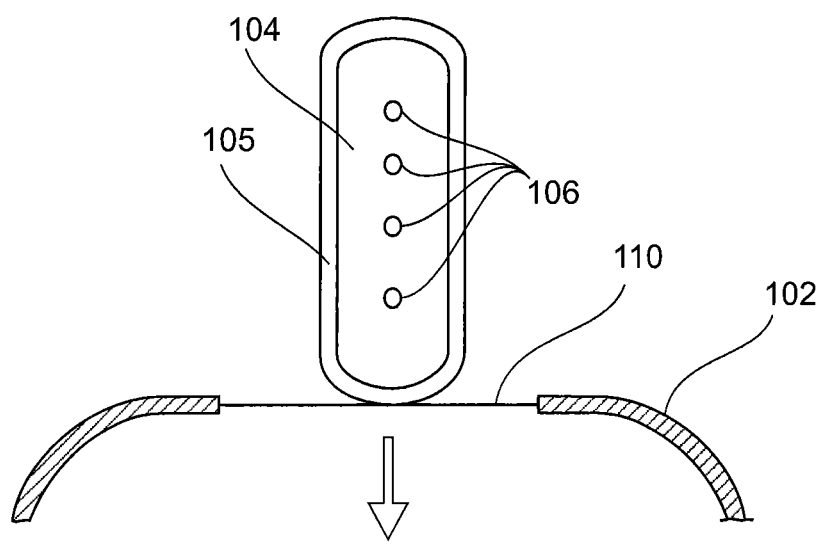
FIGS. 3a and 3b are simplified block diagrams illustrating in cross sectional views insertion and mounting of the fitting member in the closed mold vacuum infusion process according to one embodiment of the invention.
Figure 3B:
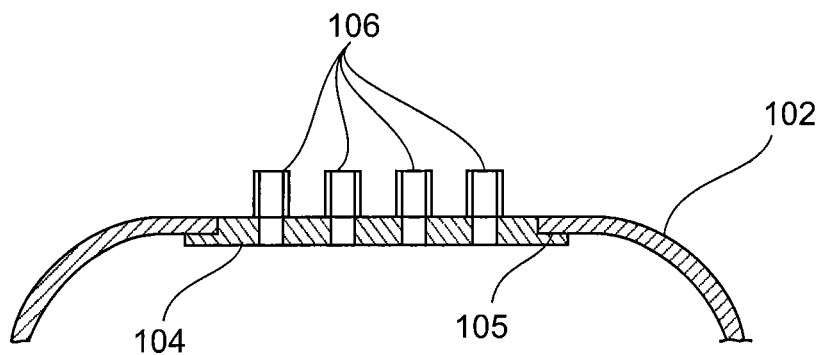

Fitting member 104 comprising fittings 106 is then mounted in a sealed fashion to the tank body 102. The fitting member 104 is, for example, manufactured using a standard vacuum infusion process with the fittings 106 being commercially available Fiberglass Reinforced Plastic (FRP) fittings mounted to previously drilled openings in the fitting member 104 using an epoxy adhesive. As illustrated in FIG. 3a, the fitting member 104 is passed through the opening 110 with fitting member 104 and the opening 110 having a corresponding elongated shape. Inside the tank body 102, the fitting member 104 is then turned and inserted into the opening 110 such that flange 105 of the fitting member is in contact with a portion of the inside surface of the tank body 102 surrounding the opening 110, as illustrated in FIG. 3b. The fitting member 104 can be mounted to the tank body 102 using an adhesive such as, for example, an epoxy adhesive, which is disposed onto the flange 105 prior insertion into the tank body 102. The epoxy adhesive employed can be PLIOGRIP EPDXY 5760B. After insertion into the opening 110 the flange 105 of the fitting member 104 is pushed towards the tank body 102 and hold in place during curing of the adhesive, for example, by providing compressed air into the tank body 102 at a pressure of, for example, 35000 Pa above outside pressure. The flange is designed to be sufficiently wide for providing a proper seal when mounted to the tank body 102 having, for example, a width of approximately 50 mm.

Alternatively, the fitting member 104 is mounted to the outside surface of the tank body 102, for example, when the tank 100 is designed for being operated at an inside pressure that is below a pressure the outside of the tank 100 is exposed to.

Finally, the base member 108—for example, manufactured using a standard vacuum infusion process—is mounted to a bottom portion of the tank body 102 using, for example, an epoxy adhesive.

The closed mold vacuum infusion process according to one embodiment of the invention has been applied for manufacturing a 1000 l domestic oil tank, illustrated in FIGS. 1a to 1e, having: height H of 1229 mm; length L of 1715 mm; width W of 602 mm; and wall thickness of 4.8 mm. The opening 110 has a length of 787 mm and a width of 203 mm and was designed to accommodate the fitting member 104 containing all the fittings 106, i.e. the opening 110 is larger than needed for removing the molding bladder 302.

As is evident the closed mold vacuum infusion process according to one embodiment of the invention is adaptable for manufacturing composite material tank bodies having various shapes and sizes.

Figure 4:
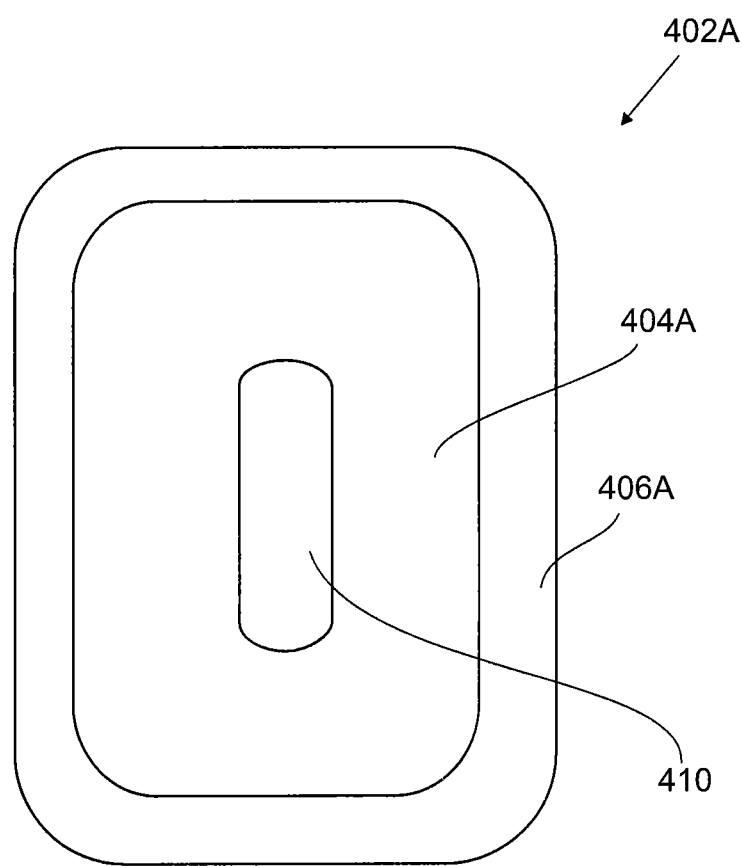
FIG. 4 is a simplified block diagram illustrating a top view of a first mold used in a closed mold vacuum infusion process according to another embodiment of the invention.

Referring to FIG. 4, another embodiment of the closed mold vacuum infusion process is provided. Here, the tank body is designed such that the opening 410 for removing the molding bladder is placed in the molding surface 404A of a single mold 402A. The processing steps are substantially the same. A reinforcement layer, having an opening corresponding to the opening 410, is placed into the mold 402A. The molding bladder is then placed onto the reinforcement layer with the sealing extension being accommodated in the opening 410 and inflated. Another reinforcement layer is then placed onto the inflated molding bladder followed by a second mold associated with the mold 402A. The following steps are then executed in a same fashion as described hereinabove.

The present invention has been described herein with regard to certain embodiments. However, it will be obvious to persons skilled in the art that a number of variations and modifications can be made without departing from the scope of the invention as described herein.

What is claimed is:

1. A tank comprising:
   a single tank body made as a single piece of a composite material using a closed molding process with a first portion of the tank body having an outside surface corresponding to a first molding surface of a first mold and a second portion of the tank body having an outside surface corresponding to a second molding surface of a second mold, the tank body having an opening disposed therein with the opening being substantially smaller than the tank body; and,
   a fitting member adapted for covering the opening and having a flange, the flange being mounted to a portion of the tank body surrounding the opening,
   wherein the composite material comprises at least a layer of fiber glass material, and wherein a first layer of the fiber glass material overlaps a second layer of the fiberglass material a predetermined distance.

2. The tank according to claim 1 wherein the first layer of the fiber glass material is disposed in the first portion of the tank body and the second layer of the fiber glass material is disposed in the second portion of the tank body.

3. The tank according to claim 1 wherein each of the first portion and the second portion of the tank body comprise a portion of the opening.

4. The tank according to claim 1 wherein the fitting member is mounted to an inside surface of the tank.

5. The tank according to claim 1 comprising a base member mounted to a bottom portion of the tank.

6. A tank comprising:
   a tank body, the tank body being a single continuous piece composite material structure with: a first portion of the outside surface of the tank body having a shape corresponding to a molding surface of a first mold; a second portion of the outside surface of the tank body having a shape corresponding to a molding surface of a second mold; and a seam connecting the first portion of the outside surface and the second portion of the outside surface, the tank body having an opening disposed therein with the opening being substantially smaller than the tank body; and,
a fitting member adapted for covering the opening and having a flange, the flange being mounted to a portion of the tank body surrounding the opening.

\* \* \* \* \*